United States Patent
Plumpe et al.

[15] 3,668,215
[45] June 6, 1972

[54] ARYL-SULPHONYL-SEMICARBAZIDES CONTAINING HETEROCYCLIC ACYLAMINO GROUPS

[72] Inventors: Hans Plumpe; Walter Puls, both of Wuppertal-Elberfeld, Germany

[73] Assignee: Farvenfabriken Bayer Aktiengesellschaft, Leverkusen, Germany

[22] Filed: Nov. 12, 1968

[21] Appl. No.: 775,138

[30] Foreign Application Priority Data

Nov. 25, 1969 Germany...................P 16 70 952.7

[52] U.S. Cl..................260/307 H, 260/239.8, 260/239.95, 260/247.1, 260/293.58, 260/293.67, 260/293.68, 260/293.7, 260/302 H, 260/307 D, 260/310 R, 424/228, 424/246, 424/248, 424/267, 424/270, 424/272, 424/273
[51] Int. Cl. ........................................................C07d 85/24
[58] Field of Search...................260/307 H, 293.67, 293.58, 260/307 D, 239.8, 239.9

[56] References Cited

FOREIGN PATENTS OR APPLICATIONS 1,176,310    1/1970    Great Britain

*Primary Examiner*—Alex Mazel
*Assistant Examiner*—R. V. Rush
*Attorney*—Jacobs & Jacobs

[57] ABSTRACT

Oral antidiabetic aryl-sulphonyl-semicarbazides having heterocyclic acylamino groups and pharmaceutical compositions are provided. Typical embodiments are represented by the compounds 4-{{4-{β-[3-methyl-isoxazolyl-(5)-carboxamido]-ethyl}-benzene-sulphonyl}-1,1-hexamethylene- semicarbazide, 4-[4-{β-[4,5-tetramethylene-isoxazolyl-(3)-carboxamido]-ethyl }-benzene-sulphonyl]-1,1-hexamethylene-semicarbazide and 4-[3-{β-[5-methyl-isoxazolyl-(3)-carboxamido]-ethyl -benzene-sulphonyl]-1,1-hexamethylene-semicarbazide which are administered in dosages of 1–10 mg/kg to a diabetic host formulated with excipients and tableted or filled into gelatin capsules.

12 Claims, No Drawings

ARYL-SULPHONYL-SEMICARBAZIDES CONTAINING HETEROCYCLIC ACYLAMINO GROUPS

It is known that arylsulphonyl-urea derivatives have a blood sugar-depressing effect. In particular, N-(4-methyl-benzene-sulphonyl)-N'-butyl-urea (tolbutamide) has achieved great importance as a therapeutic agent because of its blood sugar-depressing effect in conjunction with its good compatibility.

The present invention comprises sulphonyl-semicarbazides which contain heterocyclic acylamino groups and correspond to the formula:

in which
R is hydrogen or alkyl,
R' and R'' are each hydrogen, halogen atoms, alkyl or aryl, aralkyl or cycloalkyl radicals unsubstituted or substituted by halogen, alkyl, alkoxy or trifluoromethyl,
the grouping

is a saturated or unsaturated, monocyclic or polycyclic radical which contains one or more hetero atoms, such as nitrogen, oxygen or sulphur, —SO— or $SO_2$, and which may be substituted by alkyl, alkoxy, hydroxy or oxo groups, and X is oxygen, sulphur, imino or imino substituted by alkyl, aryl or, aralkyl radical which, in turn, is unsubstituted or substituted by halogen, alkyl, alkoxy or trifluoromethyl,
Y is a direct bond, a straight-chain or branched alkyl radical of one to eight carbon atoms, and
n is a whole number from 0 to 4, and the substituents on the benzene ring may be in ortho- or meta-, but preferably in para-position to one another.

The new compounds, as such or in the form of their alkali metal or alkaline earth metal salts, have a strong blood sugar depressing effect which substantially surpasses that of tolbutamide.

They are therefore intended for use as therapeutic antidiabetic agents to be administered per os for the treatment of diabetes.

These new arylsulphonyl-semicarbazide derivatives are prepared by various methods comprising:

a. reacting a hydrazine of the formula:
$$H_2N — NR'''R''''$$
in which
R''' and R'''' have the same meaning as above, as such or in salt form, with an arylsulphonamide derivative which contains heterocyclic acylamino groups and corresponds to the formula:

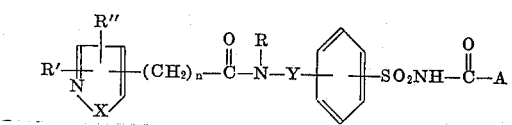

in which
R, R', R'', X, Y and n have the same meaning as above, and
A is a radical which is released in the course of the reaction with the hydrogen atom attached to the nitrogen of the hydrazine $H_2N—NR'''—R''''$ with the elimination of a compound HA,
or with a corresponding arylsulphonyl-isocyanate:

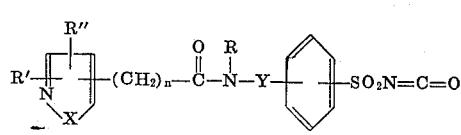

A being, for example, halogen, azido, alkoxy, aryloxy, alkylmercapto, arylmercapto, unsubstituted or substituted amino, cyclic amino or acylamino; or b. reacting an arylsulphonamide of the formula:

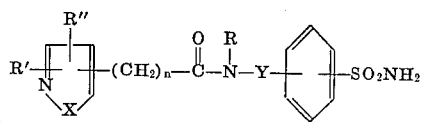

in which
R, R', R'', X, Y and n have the same meaning as above, as such or in the form of their alkali metal salts, with a hydrazine derivative of the formula:
$$B — CO — NH — NR'''R''''$$
or an isocyanate:
$$OCN — NR'''R''''$$
in which
B is a radical which reacts in the course of the reaction with a hydrogen atom of the sulphonamide group or with the alkali metal atom M of the corresponding sulphonamide alkali metal salt with the elimination of HB or MB; B is, for example, halogen, azido, alkoxy, aryloxy, alkylmercapto, arylmercapto, unsubstituted or substituted amino, cyclic amino or acylamino; or c. reacting an arylsulphonyl halide of the formula:

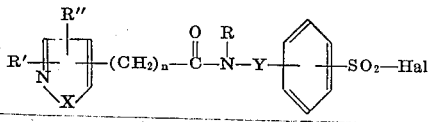

in which
R, R', R'', X, Y and n have the same meaning as above, and
Hal is a halogen atom, preferably chlorine or bromine, with a semicarbazide of the formula:
$$H_2N—CO—NH—NR'''R''''\;;\text{ or}$$

d. converting an arylsulphonyl compound of the formula:

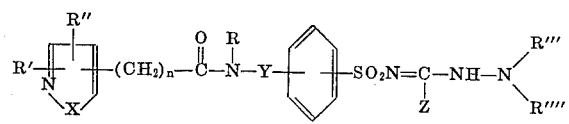

in which
R, R', R'', R''', R'''', X, Y and n have the same meaning as above,
into the desired product by oxidative hydrolysis in the case of the thiosemicarbazides (Z = SH), by acidic or alkaline hydrolysis in the case of arylsulphonyl-aminoguanidines (Z = $NH_2$), arylsulphonyl-O-alkyl-isosemicarbazides (Z = O — alkyl), arylsulphonyl-S-alkyl-isosemicarbazides (Z = S — alkyl) or arylsulphonyl-isosemicarbazide chlorides (Z = chlorine); or e. acylating an amino-(alkyl)-benzene-sulphonyl-semicarbazide of the formula:

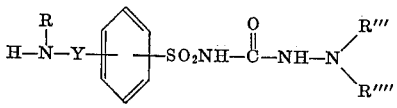

in which

R, R''', R'''' and Y have the same meaning as above, with a carboxylic acid or derivative:

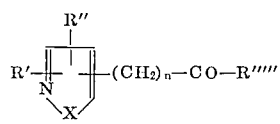

in which
R', R'', X and n have the same meaning as above, and
R''''' is a group which reacts with the hydrogen atom on the amino group of the reaction component mentioned above with the elimination of R'''''H; R''''' is, for example, hydroxy, alkoxy, aryloxy or halogen, preferably chlorine; or f. oxidizing a benzene-sulphenyl-semicarbazide ($m = 0$) or benzene-sulphinyl-semicarbazide ($m = 1$) of the formula:

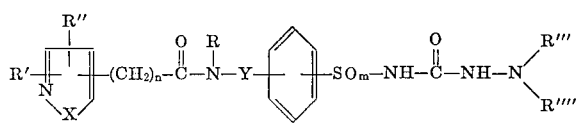

in which
R, R', R'', R''', R'''', X, Y and n have the same meaning as above; or g. hydrolyzing a parabanic acid derivative of the formula:

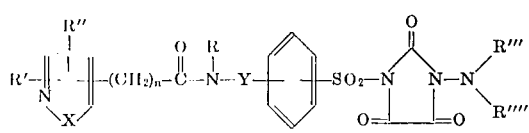

in which
R, R', R'', R''', R'''', X, Y and n have the same meaning as above.

As carboxylic acids from which the heterocyclic acyl radical in the final products of the invention are derived, there may be used, for example:
isoxazole-(5)-carboxylic acid, 3-methylisoxazole-(5)-carboxylic acid, 5-methylisoxazole-(3)-carboxylic acid, 5-methyl-3-phenylisoxazole-(4)-carboxylic acid, 3-(2', 6'-dichlorophenyl)-5-methyl-isoxazole-(4)-carboxylic acid, 3,5-dimethyl-isoxazole-(4)-carboxylic acid, isoxazole-(3)-carboxylic acid, isoxazole-(4)-carboxylic acid, 3-methylisoxazole-(4)-carboxylic acid, 5-methylisoxazole-(4)-carboxylic acid, 4,5-dimethylisoxazole-(3)-carboxylic acid, 5-hexylisoxazole-(3)-carboxylic acid, 5-octylisoxazole-(3)-carboxylic acid, 5-phenylisoxazole-(3)-carboxylic acid, 5-tert.-butyl-3-phenyl-isoxazole-(4)-carboxylic acid, 3,5-diphenylisoxazole-(4)-carboxylic acid, 3-ethyl-5-methylisoxazole-4-carboxylic acid, 5-methyl-3-phenylisoxazole-(4)-carboxylic acid, 3-phenylisoxazole-(4)-carboxylic acid, 5-phenylisoxazole-(4)-carboxylic acid, 4-chloro-3-methyl-isoxazole-(4)-carboxylic acid, 3-phenylisoxazole-(5)-carboxylic acid, 4-phenyl-isoxazole-(5)-carboxylic acid, 3,4-tetramethylene-isoxazole-(5)-carboxylic acid, 4,5-tetramethylene-isoxazole-(3)-carboxylic acid, $\beta$-isoxazolyl-(5)-propionic acid, 3,5-dimethyl-isoxazolyl-(4)-acetic acid, isothiazole-(3)-carboxylic acid, 4-phenyl-isothiazole-(3)-carboxylic acid, 5-phenyl-isothiazole-(3)-carboxylic acid, isothiazole-(4)-carboxylic acid, 3-methyl-isothiazole-(4)-carboxylic acid, 3,5-dimethyl-isothiazole-(4)-carboxylic acid, 3,5-dimethyl-isothiazole-(4)-carboxylic acid, 3-methyl-5-benzylisothiazole-(4)-carboxylic acid, 3-methyl-5-ethyl-isothiazole-(4)-carboxylic acid, 3-methyl-5-propyl-isothiazole-(4)-carboxylic acid, 3-ethyl-5-phenyl-isothiazole-(4)-carboxylic acid, isothiazole-(5)-carboxylic acid, 3-methyl-isothiazole-(5)-carboxylic acid, 4-methyl-isothiazole-(5)-carboxylic acid, pyrazole-(3)-carboxylic acid, pyrazole-(4)-carboxylic acid, 1-methyl-pyrazole-(5)-carboxylic acid, 4-methylpyrazole-(5)-carboxylic acid, 3-methylpyrazole-(4)-carboxylic acid, 3-methylpyrazole-(5)-carboxylic acid, 1-phenylpyrazole-(3)-carboxylic acid, 1-phenylpyrazole-(4)-carboxylic acid, 1-phenylpyrazole-(5)-carboxylic acid, 4-phenylpyrazole-(3)-carboxylic acid, 3-phenylpyrazole-(4)-carboxylic acid, 3-phenylphrazole-(5)-carboxylic acid, 3-methyl-1-phenylpyrazole-(4)-carboxylic acid, 5-methyl-1-phenylpyrazole-(4)-carboxylic acid, 5-methyl-1-phenyl-pyrazole-(3)-carboxylic acid, 3-methyl-1-phenyl-pyrazole-(5)-carboxylic acid, 1-methyl-5-phenyl-pyrazole-(3)-carboxylic acid, 1-methyl-5-phenyl-pyrazole-(5)-carboxylic acid, 4-methyl-3-phenyl-pyrazole-(5)-carboxylic acid, 3-methyl-5-phenyl-pyrazole-(4)-carboxylic acid, 1,4-dimethyl-pyrazole-(3)-carboxylic acid, 1,4-dimethyl-pyrazole-(5)-carboxylic acid, 1,5-dimethyl-pyrazole-(3)carboxylic acid, 1,3-dimethyl-pyrazole-(5)-carboxylic acid, 1,4-dimethyl-pyrazole-(5)-carboxylic acid, 3,5-dimethyl-pyrazole-(4)-carboxylic acid, 4,5-dimethyl-pyrazole-(3)-carboxylic acid.

Suitable compounds for introducing the sulphonamide component into the final products according to the invention are, for example 3-aminobenzene-sulphonamide, 4-aminobenzene-sulphonamide, 4-aminomethylbenzene-sulphonamide, 4-($\alpha$-aminoethyl)-benzene-sulphonamide, 4-($\beta$-aminoethyl)-benzene-sulphonamide, 4($\alpha$-aminopropyl)-benzene-sulphonamide, 4-($\beta$-aminopropyl)-benzene-sulphonamide, 4-($\gamma$-aminopropyl-sulphonamide), 4-($\alpha$-amino-$\alpha,\alpha$-dimethylmethyl)-benzene-sulfonamide, 4-methyl-aminobenzene-sulphonamide and similar compounds in the form of their base or of salts with acids.

Suitable hydrazines from which the group —NH—NR' "R''''" in the products according to the invention are derived, are, for example:
1-amino-pyrrolidine, 1-amino-piperidine, N-amino-morpholine, 1-amino-hexamethylene-imine, 1-amino-4-methyl-piperideine-(4), N-aminothiamorpholine, N-aminothiamorpholine-S,S-dioxide, N-amino-3-methyl-thiamorpholine-S,S-dioxide, 3-amino-3-azabicyclo[3,2,0]-heptane, 3-amino-3-azabicyclo[3,2,1]-octane, 6-amino-6-azabicyclo[3,2,1]-octane, 3-amino-3-azabicyclo[3,2,2]-nonane, 3-amino-3-azabicyclo-[3,3,1]-nonane, 2-amino-2-azabicyclo-[2,2,2]-octane, N-amino-nortropane, N-amino-granatanine and their alkyl-substitution products, N-amino-camphidine, N-amino-4,7-endocyclo-propylene-$\Delta^5$-hexahydro-isoindole, N-amino-4,7-endocyclobutenylene-$\Delta^5$-hexahydro-isoindole, N-amino-4,7-endocyclobutylene-octahydro-isoindole.

Depending on the method of operation, the hydrazines can be used as such or in the form of their derivatives such as carbazidic acid chlorides, carbazidic acid esters or carbazidic acid azides.

The reactions are carried out without or in suitable solvents or diluents; depending on the reactivity of the components, the reaction is itself exothermic or its progress must be brought about or furthered by the use of elevated temperatures. The final products can be converted into therapeutically applicable salts.

Products which contain one or more optically active carbon atoms can be obtained not only in the form of the racemates, but also in their optically active forms, either by using for their preparation, from the start, a corresponding optically active bicyclic amino compound or by subjecting racemic intermediates or final products to a racemate resolution.

EXAMPLE 1
a. 92.8 g (0.3 mole) of 4-{$\beta$-[3-methyl-isoxazolyl-(5)-carboxamido]-ethyl}-benzene-sulphonamide (prepared from 3-methyl-isoxazole-(5)-carboxylic acid chloride and 4-($\beta$-aminoetyl)-benzene-sulphonamide hydrochloride in pyridine, m.p. 219°–220° C.) are heated in 1.5 liters of methyl ethyl ketone with 82.8 g (0.6 mole) of pulverized potassium carbonate under reflux for 40 minutes while stirring. After cooling to room temperature, 47.3 g (0.5 mole) of chloroformic acid methyl ester are added dropwise, the mixture is stirred at room temperature for 15 minutes and under reflux for 4 hours, the product is filtered off with suction while hot and washed with methyl ethyl ketone. The residue is dissolved in water, the solution clarified with activated charcoal, and the filtrate acidified with hydrochloric acid. The resultant precipitate is filtered off with suction, washed with water, and dried. 85.6 g (77 percent of theory) of N-{{4-{$\beta$-[3-methyl-isoxazolyl-(5)-carboxamido]-ethyl}-benzene-sulfonyl}}-methyl-urethane are obtained in the form of a colorless finely crystalline powder of m.p. 184° C.

b. 7.3 g (0.02 mole) of this compound are dissolved in 150 ml of methanol, 2.5 g (0.022 mole) of N-amino-hexamethyleneimine are added, and the methanol is distilled off, finally under reduced pressure; the residue is finally heated at 110° to 120° C. for 30 minutes, whereupon it solidifies to form a solid mass which is recrystallized from ethanol. 6.2 g (69 percent of theory) of 4-{{4-{$\beta$-[3-methyl-isoxazolyl-(5)-carboxamido]-ethyl}-benzene-sulfonyl}}-1,1-hexamethylene-semicarbazide are obtained in the form of colorless crystals of m.p. 194° C.

EXAMPLE 2 a. By analogy to Example 1(a), there is obtained from 4-{$\beta$-[5-methyl-isoxazolyl-(3)-carboxamido]-ethyl}-benzene-sulphonamide (prepared from 5-methyl-isoxazole-(3)-carboxylic acid chloride and 4-($\beta$-aminoethyl)-benzene-sulphonamide hydrochloride, m.p. 213°–214° C. in pyridine) and chloroformic acid methyl ester, in a yield of 69 percent, the compound N-{{-4-{$\beta$-[5-methyl-isoxazolyl-(3)-carboxamido]-ethyl}-benzene-sulfonyl}}-methyl-urethane in the form of colorless crystals of m.p. 173° C.

b. From the sulphonyl-urethane described above and N-amino-hexamethylene-imine, there is obtained, by analogy to the method described in Example 1(b), in a yield of 70 percent, the compound 4-{{4-{$\beta$-[5-methyl-isoxazolyl-(3)-carboxamido]-ethyl}-benzene-sulphonyl}}-1,1-hexamethylene-semicarbazide in the form of colorless crystals of m.p. 189° C.

EXAMPLE 3

By analogy to Example 1(b), there is obtained, from the sulphonyl-urethane prepared according to Example 1(a) and N-amino-isoquinuclidine, the compound 4-{{4-{$\beta$-[3-methyl-isoxazolyl-(5)-carboxamido]-ethyl}-benzene-sulphonyl}}-1,1-[1', 4'-ethano)-pentamethylene-semicarbazide] in the form of colorless crystals of m.p. 197° C.

EXAMPLE 4

By analogy to Example 1(b), there is obtained, from the sulphonyl-urethane prepared according to Example 2(a) and N-amino-isoquinuclidine, the compound 4-{{4-{$\beta$-[5-methyl-isoxazolyl-(3)-carboxamido]-ethyl}-benzene-sulphonyl}}-1,1-[1',4'-ethano]-pentamethylene-semicarbazide in the form of colorless crystals of m.p. 190° C.

Furthermore, with N-aminopiperidine, the compound 4-{{4-{$\beta$-[5-methylisoxazolyl-(3)-carboxamido]-ethyl}-benzene-sulphonyl}}-1,1-pentamethylene-semicarbazide of m.p. 185° C.; with N-aminomorpholine, the compound 4-{{4-{$\beta$-[5-methylisoxazolyl-(3)-carbonamido]-ethyl}-benzene-sulphonyl}}-1,1-(oxydiethylene)-semicarbazide of m.p. 174° C.; with 3-methyl-4-aminothiomorpholine-1-dioxide, the compound 4-{{4-{$\beta$-[5-methylisoxazolyl-(3)-carboxamido]-ethyl}-benzene-sulphonyl}}-1,1-(2'-methyl-sulphonyl-diethylene)-semicarbazide of m.p. 180° C.

EXAMPLE 5

4[3-methylisoxazolyl-(5)-carboxamido]-benzene-sulphonamide, m.p. 249° C. (prepared from 3-methylisoxazole-(5)-carboxylic acid chloride and 4-aminobenzenesulphonamide-hydrochloride in pyridine), by analogy to Example 1(a) with chloroformic acid methyl ester is transformed into the corresponding sulphonyl-urethane of m.p. 244° C. Similarly to Example 1(b) there is obtained therefrom with N-aminohexamethyleneimine, the compound 4-{4-[3-methylisoxazolyl-(5)-carboxamido]-benzenesulphonyl}-1,1-hexamethylene-semicarbazide as a colorless fine crystalline powder of m.p. 227° C., and with N-amino-morpholine, the compound 4-{4-[3-methylisoxazolyl-(5)-carboxamido]-benzene-sulphonyl}-1,1-(oxydiethylene)-semicarbazide of m.p. 243° C.

EXAMPLE 6

4-[5-methylisoxazolyl-(3)-carboxamidomethyl]-benzenesulphonamide of m.p. 210° C. (prepared from 5-methyl-isoxazole-(3)-carboxylic acid chloride and 4-aminomethyl-benzenesulphonamide hydrochloride in pyridine) is by analogy to Example 1(a) with chloroformic acid methyl ester transformed into the corresponding sulphonyl-urethane, i.e., N-{{4-[5-methylisoxazolyl-(3)-carboxamido]-methyl-benzene-sulphonyl}}-methyl-urethane, of m.p. 172° C. Similarly to Example 1(b) there is obtained therefrom with N-aminohexamethylene-imine the compound 4-{4-[5-methylisoxazolyl-(3)-carboxamido-methyl]-benzenesulphonyl}-1,1-hexamethylene-semicarbazide of m.p. 180° C., as a colorless fine crystalline powder, and with N-aminomorpholine, the compound 4-{4-[5-methylisoxazolyl-(3)-carboxamidomethyl]-benzenesulphonyl}-1,1-(oxydiethylene)-semicarbazide of m.p. 225° C.

EXAMPLE 7

4-{$\alpha$-[5-methylisoxazolyl-(3)-carboxamido]-ethyl}-benzene-sulphonamide of m.p. 169° to 171° C., (prepared from 5-methylisoxazole-(3)-carboxlyic acid chloride and 4-($\alpha$-aminoethyl)-benzene-sulphonamide in pyridine) by analogy to Example 1(a) with chloroformic acid methyl ester is transformed into the corresponding sulphonylmethylurethane of m.p. F. 74° C. Therefrom there is obtained similarly to Example 1(b) with N-aminohexamethyleneimine the compound 4-{{4-{$\alpha$-[5-methyl-isoxazolyl-(3)-carboxamido]-ethyl}-benzene-sulphonyl}}-1,1-hexamethylene-semicarbazide of m.p. 181° C., as a colorless fine crystalline powder.

EXAMPLE 8

Similarly to Example 2(a) there is obtained from 4-{$\alpha$-[5-methylisoxazolyl-(3)-carboxamido]-propyl}-benzene-sulphonamide (prepared from 5-methylisoxazole-3-carboxylic acid chloride and 4-($\alpha$-aminopropyl)-benzenesulphonamide-hydrochloride in pyridine of m.p. 165° C.) and chloroformic acid methyl ester, the compound N-[4-{$\alpha$-[5-methylisoxazolyl-(3)-carboxamido]-propyl}-benzenesulphonyl]-methylurethane of m.p. 146°–148° C., and therefrom similarly to Example 2(b) with N-aminohexamethylene-imine, the compound 4-[4-{$\alpha$-[5-methylisoxazolyl-(3)-carboxamido]-propyl}-benzenesulphonyl]-1,1-hexamethylene-semicarbazide of m.p. 161° C.

EXAMPLE 9

Similarly to Example 2(a) there is obtained from 4-{$\beta$-[4,5-tetramethylene-isoxazolyl-(3)-carboxamido]-ethyl}-benzenesulphonamide (prepared from 4,5-tetramethylene-isoxazole-3-carboxylic acid chloride and 4-($\beta$-aminoethyl)-benzenesulphonamide-hydrochloride, in pyridine of m.p. 175° C.) and chloroformic acid methyl ester the compound N-[4-{$\beta$-[4,5-tetramethylene-isoxazolyl-(3)-carboxamido]-ethyl}-benzenesulphonyl]-urethane of m.p. 172° C. and therefrom by analogy to EXAMPLE 2(b) with N-aminohexamethyleneimine, the compound 4-[4-{$\beta$-[4,5-tetramethylene-isoxazolyl-(3)-carboxamido]-ethyl}-benzenesulphonyl]-1,1-hexamethylene-semicarbazide of m.p. 180° C.

EXAMPLE 10

Similarly to Example 2(a) there is obtained from 4-{β-[1,5-dimethyl-pyrazolyl-(3)-carboxamido]-ethyl}-benzenesulphonamide (produced from 1,5-dimethylpyrazole-3-carboxylic acid chloride and 4-(β-aminoethyl)-benzenesulphonamide-hydrochloride in pyridine of m.p. 225° C.) and chloroformic acid methyl ester, the compound N-[4-{β-[1,5-dimethylpyrazolyl-(3)-carboxamido]-ethyl}-benzenesulphonyl]-methyl-urethane of m.p. 211° C., and therefrom similarly to Example 2(b) with hexamethyleneimine, the compound 4-[4-{β-[1,5-dimethylpyrazolyl-(3)-carboxamido-ethyl}-benzenesulphonyl]-1,1-hexamethylene-semicarbazide of m.p. 186°–188° C.

EXAMPLE 11

Similarly to Example 2(a) there is obtained from 4-{β-[3-methylisothiazolyl-(5)-carboxamido]-ethyl}-benzenesulphonamide (prepared from 3-methylisothiazole-(5)-carboxylic acid chloride and 4-(β-aminoethyl)-benzenesulphonamide-hydrochloride in pyridine of m.p. 190° C.) and chloroformic acid methyl ester, the compound N-[4-{β-[3-methylisothiazolyl-(5)-carboxamido]-ethyl}-benzenesulphonyl]-methylurethane of m.p. 161° C., and therefrom similarly to Example 2 (b) with N-aminohexamethyleneimine, the compound 4-[4-{β-[3-methylisothiazolyl-(5)-carboxamido]-ethyl}-benzenesulphonyl]-1,1-hexamethylene-semicarbazide of m.p. 171° C.

EXAMPLE 12

Similarly to Example 2(a) there is obtained from 3-{β-[5-methylisoxazolyl-(3)-carboxamido]-ethyl}-benzenesulphonyl (prepared from 5-methyl-isoxazole-3-carboxylic acid chloride and 3(β-amidoethyl)-benzenesulphonamide-hydrochloride in pyridine of m.p. 115° C.) and chloroformic acid methyl ester, the compound N-[3{β-[5-methylisoxazolyl-(3)-carboxamido]-ethyl}-benzenesulphonyl]-methylurethane of m.p. 143° C., and therefrom with N-amino-hexamethylene-imine like 2(b), the compound 4-[3-{β-[5-methylisoxazolyl-(3)-carboxamido]-ethyl}-benzene-sulphonyl]-1,1-hexamethylene-semicarbazide of m.p. 183° C.

The blood sugar lowering action of 4-[4 -{β-[5-methylisoxazolyl-(3)-carbozamido]-ethyl}-benzenesulphonyl]-1,1-hexamethylene-semicarbazide, in comparison to 4-(4-tolyl-sulphonyl)-1,1-hexamethylene-semicarbazide (Tolazamide) as to ingestion at the start of the tests of fed rats:

Blood Sugar in % of the Starting Value

| Hours after Administration | 4-[4-{β-[5-methyl-isoxazolyl-(3)-carbox-amido]-ethyl}-benzene-sulphonyl]-1,1-hexa-methylene-semicarbazide | | | Tolazamide |
|---|---|---|---|---|
| | Dosage mg/kg | | | |
| | 0.01 | 0.1 | 1 | 10 |
| 1.5 | 86 | 57 | 97 | 57 |
| 3.0 | 92 | 76 | 100 | 86 |

For therapeutic purposes, 4-[4-{β-[5-methylisoxazolyl-(3)-carboxamido]-ethyl}-benzenesulphonyl]-1,1-hexamethylene-semicarbazide is orally administered in tablet or capsule form, for example, in dosages of 1 to 10 mg per person.

TABLETS

The finely pulverized active substance is thoroughly mixed with the requisite additives and compressed into tablets so that each tablet contains the following substances:

1 mg 4-[4-{β-[5-methylisoxazolyl-(3)-carboxamido]-ethyl} -benzene-sulphonyl]-1,1 -hexamethylene-semi-carbazide
10 mg Colloidal silica
20 mg Cornstarch
1 mg Magnesium stearate
68 mg Lactose

Hard Gelatin Capsules

The finely pulverized active substance is mixed with the requisite additives and filled into capsules so that each capsule contains the following substances:

1 mg 4-[4-{β-[5-methylisoxazolyl-(3)-carboxamido]-ethyl}-benzene-sulphonyl]-1,1 -hexamethylene-semi-carbazide
79 mg Lactose
10 mg Cornstarch

What is claimed is:

1. A sulphonyl-semicarbazide having heterocyclic acylamino groups and corresponding to the formula:

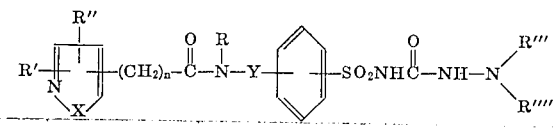

in which
R is hydrogen or methyl,
R' and R" are each hydrogen, halogen, alkyl of one to eight carbon atoms, or together tetramethylene in the 4,5 position,
R''' and R'''' together are alkylene of four to six carbon atoms unsubstituted or substituted by methyl, and
X is oxygen,
Y is a direct bond or straight- or branched-chain alkyl of one to three carbon atoms; and
n is a whole number from 0 to 4, the substituents on the benzene ring being ortho-, meta- or para- to one another, or a pharmaceutically acceptable non-toxic alkali metal or alkaline earth metal salt thereof.

2. An alkali metal or alkaline earth metal salt of a compound of claim 1.

3. A compound of claim 1 in which the substituents on the benzene ring are in the para-position to one another.

4. The compound 4-{{4-{β-[3-methyl-isoxazolyl-(5)-carboxamido]-ethyl}-benzene-sulphonyl}}-1,1-hexamethylene-semicarbazide.

5. The compound 4-[4-{β-[4,5-tetramethylene-isoxazolyl-(3)-carboxamido]-ethyl}-benzenesulphonyl]-1,1-hexamethylene-semicarbazide.

6. The compound 4-[3-{β-[5-methylisoxazolyl-(3)-carboxamido]-ethyl}-benzenesulphonyl]-1,1-hexamethylene-semicarbazide.

7. The compound 4-{{4-{β-[5-methyl-isoxazolyl-(3)-carboxamido]-ethyl}-benzenesulphonyl}}1,1-hexamethylene-semicarbazide.

8. The compound according to claim 1 which is: 4-{{4-{β-[5-methyl-isoxazolyl-(3)-carboxamido]-ethyl}-benzenesulphonyl}}-1,1-pentamethylene-semicarbazide.

9. The compound according to claim 1 which is: 4-{4-[3-methyl-isoxazolyl-(5)-carboxamido]-benzenesulphonyl}-1,1-hexamethylene-semicarbazide.

10. The compound according to claim 1 which is: 4-{4-[5-methyl-isoxazolyl-(3)-carboxamido-methyl]-benzenesulphonyl}-1,1-hexamethylene-semicarbazide.

11. The compound according to claim 1 which is: 4-{{4-{α-[5-methyl-isoxazolyl-(3)-carboxamido]-ethyl}-benzenesulphonyl}}-1,1-hexamethylene-semicarbazide.

12. The compound according to claim 1 which is: 4-[4-{α-[4-methyl-isoxazolyl-(3)-carboxamido]-propyl}-benzenesulphonyl]-1,1-hexamethylene-semicarbazide.

* * * * *